April 24, 1928.
J. R. TURNER
1,667,573
FISH SMOKING APPARATUS
Filed April 2, 1927
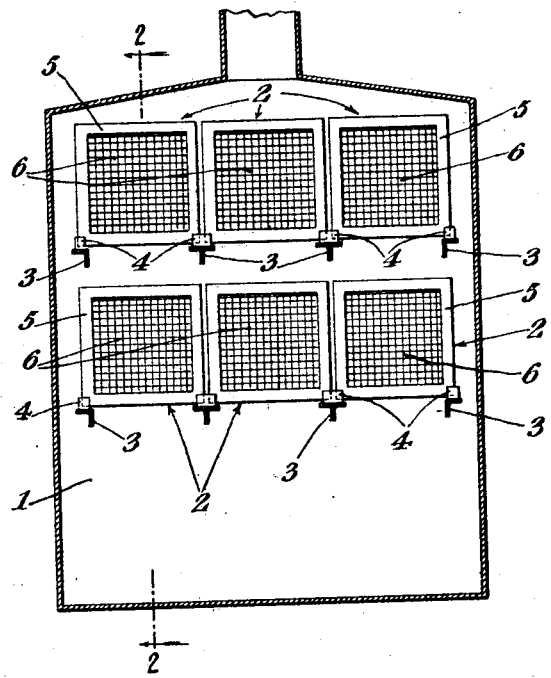
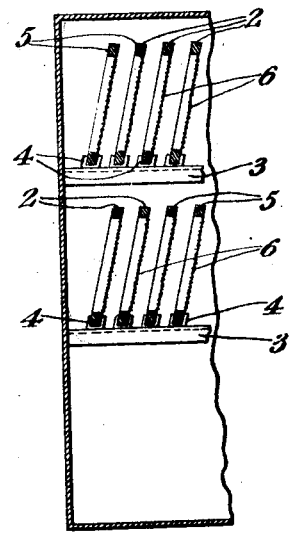
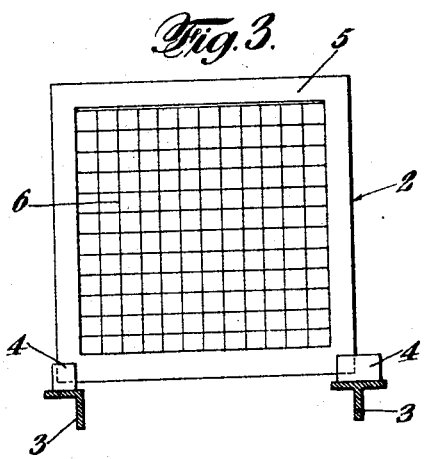
Inventor
James R. Turner
By his Attorneys Patented Apr. 24, 1928.

1,667,573

UNITED STATES PATENT OFFICE.

JAMES R. TURNER, OF JERSEY CITY, NEW JERSEY.

FISH-SMOKING APPARATUS.

Application filed April 2, 1927. Serial No. 180,598.

The invention aims to provide an apparatus for smoking fish, in which the fish to be smoked is so supported as to be capable of rapid handling in placing the same into and removing it from the smoking chamber, which apparatus shall be compact, convenient and expose all of its contents properly to the action of the fumes during the smoking process.

Another object of the invention, which is of particular advantage when the apparatus is used for smoking fish which has been skinned and filleted, is to avoid injury to or undue marking of the fish during the smoking process. Further objects and advantages of the invention will be in part obvious and in part specifically pointed out in the description hereinafter contained which, taken in conjunction with the accompanying drawings, discloses an apparatus adapted to operate in accordance therewith. Such apparatus, however, should be considered merely as illustrative of the principles of the invention. In the drawings—

Fig. 1 is a vertical sectional view of an apparatus constructed in accordance with the invention.

Fig. 2 is a section taken on line 2—2 of Fig. 1, but showing a portion only of the apparatus of Fig. 1.

Fig. 3 is a front elevation showing detached and on an enlarged scale, one of the racks and its support, which form a part of the apparatus shown in Fig. 2.

Fig. 4 is a section on line 4—4 of Fig. 3 looking in the direction of the arrows.

The apparatus is shown as provided with a suitable smoking room or chamber 1 which need not be described in detail. In accordance with the present invention the fish to be smoked is carried in a suitable number of racks or trays 2 which are detachably supported within chamber 1 and provided with meshed, grid-like or "open work" bottoms or backs, in order to expose the fish thoroughly to the smoke fumes within the chamber.

Heretofore, in so far as I am aware, no satisfactory smoking apparatus has been available for the treatment of fish which has been filleted and skinned, leaving the fish in a very tender and easily injured condition, so that it may not be hung up in the smoking room in accordance with usual practice. I have found, however, that the smoking operation may be satisfactorily carried out with filleted and skinned fish, by placing the pieces of fish in racks 2 of the nature above described and then supporting the racks in somewhat inclined position, and slightly spaced from each other, within chamber 1, the inclination of the racks being sufficient to prevent the fish pieces from sliding down along the bottoms or backs of the racks, but the racks being sufficiently vertical to permit the pieces to drain during the smoking operation.

In this way the fish may be rapidly handled, being placed in the racks and removed therefrom outside of the smoking chamber, and the loaded racks set successively in position in the smoking chamber. Many fish pieces or fillets may be placed side by side on a rack, perpendicular to that edge of the rack which is its bottom edge when in operative position in the smoking chamber. The above arrangement of the racks within the smoking chamber affords a large capacity for the apparatus and permits the fumes to pass up between and through the inclined racks so as to expose all surfaces of the fish pieces thoroughly to the smoke.

In the illustrated form of the invention the racks 2 are supported upon parallel beams 3 which extend across the smoking chamber and of which there of course may be as many as desired. On the top of each beam is supported a series of somewhat spaced rack engaging members 4 which are shown as of inclined U-shape. The racks may consist of wooden frames 5 having bottoms 6, for example, of ordinary chicken wire of ¾ inch or 1 inch mesh, and thus each rack may be held in desired position by setting into a pair of engaging members 4 carried by adjacent beams 3. The bottoms preferably are made of wire or other material of slight width, to prevent the parts of the fish pieces which engage them from being left unsmoked and therefore easily subject to decay. Preferably the members 4 are so positioned as to leave a space between adjacent racks which is about equal to the depth or thickness of the racks, whereby each pair of adjacent beams, carries a row of parallel, slightly spaced, racks which are sufficiently inclined to prevent the fish pieces from slipping along the backs or bottoms of the racks. In this way, the fish is so supported as to avoid undue marking or breaking up of the filleted and skinned pieces during the smoking process or handling incident thereto, and the apparatus affords a large capacity while still adequately and evenly exposing all of the fish pieces to the action of the fumes.

While a specific apparatus has been described above, it will be obvious that many changes may be made therein without departing from the essentials of the invention as set forth in the appended claims.

I claim:

1. An apparatus for smoking fish, comprising a smoking chamber and a plurality of racks having openwork backs adapted to support fish to be smoked, together with means for detachably supporting said racks in slightly spaced positions within said chamber and at such inclination that the backs support the fish pieces without slippage and permit them to drain, and the fumes pass upwardly between adjacent racks to act substantially uniformly on both sides of the fish pieces.

2. An apparatus for smoking fish, comprising a smoking chamber and a plurality of racks having openwork backs adapted to support fish to be smoked, together with means for detachably supporting said racks in one or more rows within said chamber, with the racks of each row substantially parallel to and slightly spaced from each other, and at such inclination that the backs support the fish pieces without slippage and permit them to drain, and the fumes pass upwardly between adjacent racks to act substantially uniformly on both sides of the fish pieces.

3. An apparatus for smoking fish, comprising a smoking chamber, a plurality of substantially parallel supporting members therein, racks having openwork backs adapted to support fish to be smoked, and rack engaging members carried by said supporting members adapted to engage lower edge parts of the racks and detachably hold the latter in slightly spaced, and substantially parallel positions above the corresponding supporting members, and at such inclination that the backs support the fish pieces without slippage and permit them to drain, and the fumes pass upwardly between adjacent racks to act substantially uniformly on both sides of the fish pieces.

4. An apparatus for smoking fish, comprising a smoking chamber, a plurality of substantially parallel supporting members therein, a plurality of racks having openwork backs adapted to support fish to be smoked and a series of rack-engaging members carried by said supporting members for detachably holding said racks in position in said chamber at such inclination that the backs support the fish pieces without slippage and permit them to drain, and the fumes pass upwardly between adjacent racks to act substantially uniformly on both sides of the fish pieces.

5. An apparatus for smoking fish, comprising a smoking chamber, a plurality of substantially plane racks each having a frame and a wire mesh bottom adapted to support fish to be smoked, and means provided in said chamber for detachably holding said racks in slightly spaced positions in said chamber and at such inclination that the backs support the fish pieces without slippage and permit them to drain, and the fumes pass upwardly between adjacent racks to act uniformly on both sides of the fish pieces.

In testimony that I claim the foregoing, I have hereunto set my hand this 31st day of March, 1927.

JAMES R. TURNER.